INVENTOR.
John R. Scheder
BY
Howard G. Russell
his ATTORNEY

United States Patent Office 3,595,767
Patented July 27, 1971

3,595,767
PREVENTION OF CALCIUM PRECIPITATION IN THE ELECTRODIALYTIC DEMINERALIZATION OF WHEY
John R. Scheder, Horicon, Wis., assignor to Purity Electrochemical Company, Mayville, Wis.
Filed Feb. 27, 1969, Ser. No. 802,848
Int. Cl. B01d *13/02*
U.S. Cl. 204—180P
4 Claims

ABSTRACT OF THE DISCLOSURE

Whey is demineralized in a multichamber electrodialysis cell comprising alternating ion exchange membranes and neutral membranes. Calcium precipitation occurring in the cell primarily in its concentrating chambers on the face of the ion selective membranes bordering the concentrating chambers, and caused by accidental whey leakage in the concentrating stream, is prevented by a hydraulic pressure differential between the concentrating stream and the whey stream causing, in the event of hydraulic leakage, concentrate to pass into the whey stream rather than whey to pass into the concentrating stream. A beneficial side effect of the hydraulic pressure inequality is an apparent reduction in membrane polarization.

---

Figure 1:
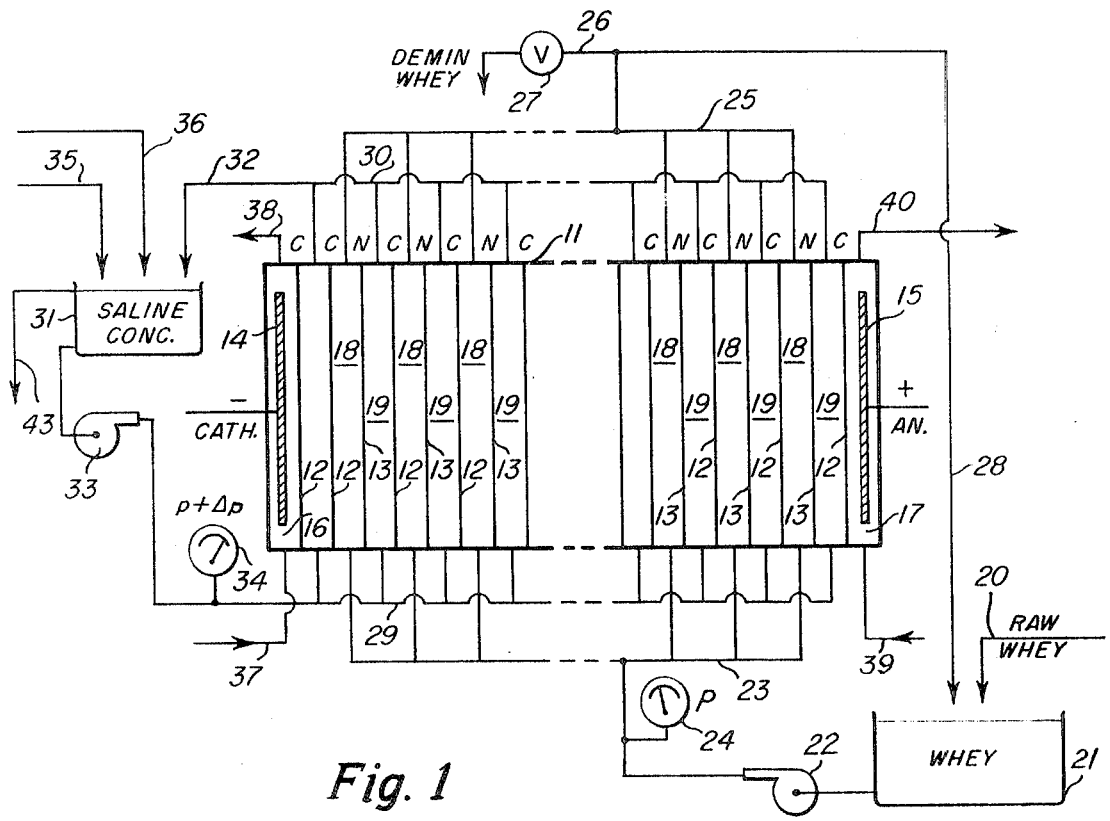

This invention provides improvements in the method process and apparatus for the demineralization of whey by electrodialysis.

More particularly, the invention provides improvements and refinements of a method comprising the passage of a stream of whey solution through certain deionization chambers of a multichamber cell in which deionization chambers and concentrating chambers are arranged in alternating order, which chambers are defined by a plurality of spaced alternatingly arranged membranes of two kinds, the one kind being selectively permeable to cations and passage-resistant to anions, the membranes of the other kind being substantially neutral, which membrane arrangement would permit, in the absence of other ion passage controlling conditions, passage of cations through a plurality of successive whey streams and other streams therebetween.

These other streams are streams of an electrolyte solution which acts as a concentrating stream into which ions of the raw whey, for example salt ions, are transferred under the action of an electrical potential applied at electrodes, between which an electric current passes in series across said membranes and the chambers defined between them. The electrodes are disposed in electrode chambers through which an electrolyte is passed.

The aforesaid method and apparatus form the subject matter of my copending patent applications Ser. No. 802,766, filed Feb. 27, 1969, and Ser. No. 803,014, filed Feb. 27, 1969, and represent improvements over a prior art practice employing cation selective and anion selective ion exchange membranes involving problems of membrane clogging, membrane polarization and relatively short membrane life, particularly on the part of the anion membranes, to mention only a few of the difficulties encountered with prior art apparatus.

My aforesaid improved method and apparatus which dispense with anion selective membranes operate in a manner non-equivalent with respect to the known arrangement, in that the absence of anion membranes permits cations to pass through successive membranes and chambers. This characteristic gives rise to operational changes with respect to the known arrangement.

My above identified copending patent applications deal with particular measures to control certain phenomena resulting from such cation passage in the method and apparatus employed on a commercial scale.

Commercial whey demineralization cells are complex structures involving a great number of membranes, of the order of one hundred, a similar number of chambers and many ducts and gaskets and other seals.

I discovered that occasionally a deposit of calcium phosphate forms on the cation membranes in the salt collecting streams which then leads to a current decrease, in the event a voltage regulating device is employed for maintaining the voltage constant, or a potential increase, in the event the current is maintained constant. Such potential increase occasions heating of the cell and leads to eventual cell failure.

The causes of the calcium precipitation were puzzling, as in some instances precipitation would occur, while in other instances it would not, even though there was no change in the composition of the raw whey solution being processed.

I discovered that the calcium precipitation is traceable to the presence of whey in the salt stream and I confirmed that discovery by deliberately provoking calcium precipitation by addition of whey to the concentrating stream in a leakage-free cell.

In the normal and commercial operation of the process whey finds its way into the concentrating stream by hydraulic leakage. The occurrence of such leakage is unpredictable. It may occur in a membrane, at a membrane seal, or in a duct at a gasket. The locations at which leakage may occur are numerous, in view of the complexity of the apparatus.

In order to preclude cell failure as a result of a hydraulic leakage, I maintain, according to this invention, a higher hydraulic pressure in the concentrating stream than in the whey stream. Should a leak occur, saline solution enters the whey stream, which is tolerable and results only in decreased efficiency of the operation, whereas the reverse, leakage of whey into the salt stream, is not tolerable as it leads to the aforementioned cell failure, particularly when in a recirculating system the whey spreads to all the concentrating chambers and causes calcium precipitation therein.

In testing my improvement I discovered an incidental and unexpected further advantage: Polarization of the membranes appears to be markedly reduced. Comparing the operation of a leak-free cell under condition of hydraulic pressure equality with the operation under a condition of the salt chamber pressure exceeding the whey chamber pressure, I found that a lower operating potential can be maintained. The reason for this behavior is not yet fully understood, but without wishing to limit myself to any theory, I believe that one of the causes is the reduction or elimination of a quiescent laminar liquid layer at the face of the membrane. The pressure differential causes the membrane to be pressed against a mechanical mesh type spacer in the whey chamber and in consequence the liquid at the membrane face flows in a more turbulent manner. Whatever the cause or causes, of which there may be several, the improvement occurs with certainty when the hydraulic pressure in the concentrating chambers exceeds that in the salt collecting chambers.

The hydraulic pressure differential may be produced in any of a number of ways. A tank from which concentrating electrolyte is supplied may be placed at a higher level than the whey tank, producing the required hydrostatic pressure differential.

The hydraulic pressure differential may also be produced by differences in the respective flow rates of whey and concentrating electrolyte, or by the use of flow restrictions in the concentrate effluent passage.

The hydraulic pressure differential may also be produced by a combination of the foregoing measures.

The various objects, features and advantages of this invention will appear more fully from the detailed description which follows accompanied by drawings showing, for the purpose of illustration, a representative cell arrangement for the practice of this invention. The invention also resides in certain new and original method steps, sequence of steps and combination of devices therefor.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of this disclosure.

Figure 2A:
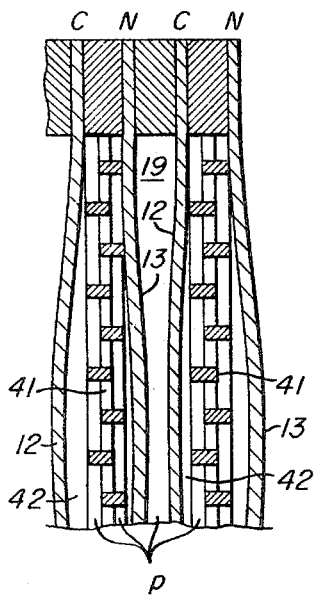
Figure 2B:
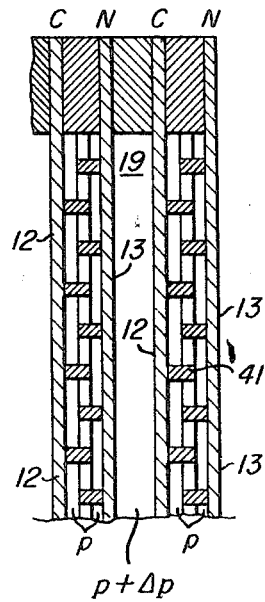

In the drawings:

FIG. 1 is a diagrammatic illustration of a representative whey demineralizing cell incorporating the present invention; and FIGS. 2a and 2b are cross sectional views of a portion of the cell under conditions of pressure-equality and -unequality, respectively.

In the following description and in the claims various details will be identified by specific names for convenience. The names, however, are intended to be generic in their application. Corresponding reference characters refer to corresponding elements in the several figures of the drawings.

The drawings accompanying, and forming part of, this specification disclose certain details for the purpose of explanation of broader aspects of the invention, but it should be understood that certain structural details may be modified in various respects without departure from the principles of the invention and that the invention may be incorporated in, and practiced by, structurally different cell systems than shown.

The electrodialysis cell 11 comprises alternatingly arranged cation-permeable, anion-passage-resistant membranes 12 of ion exchange material and neutral membranes 13, cellophane being a representative example of the latter.

Electrodes 14 and 15 are mounted in electrode chambers 16 and 17, electrode 14 being connected to a source (not shown) of negative direct potential, which makes it a cathode, and electrode 15 being connected to a source of positive direct potential, which makes it an anode.

In the illustrated arrangement of membranes and electrodes every other chamber, excluding the electrode chambers, becomes a deionization chamber 18, and the chambers 19 therebetween become concentrating chambers.

Whey to be demineralized is passed through the chambers 18 causing anionic and cationic components to migrate out of the chambers through the bordering membranes under the influence of the applied electrical potential, the movement of the ions resulting in an electric current flowing through the cell from electrode to electrode.

Whey to be deionized flows through a supply duct 20 into a tank 21 whence it is withdrawn by a pump 22 which feeds it into a manifold 23 and thence into the whey chamber 18, the hydraulic pressure $p$ of the pump discharge being indicated at a gage 24.

Deionized whey flows from the deionizing chambers 18 into a collecting manifold 25. A portion of the product may be withdrawn through a product duct 26 controlled by a valve 27, the balance being returned to the tank 21 by a return duct 28.

It is obvious that in order to maintain the whey level constant in the tank 21, the whey supply through the duct 20 must match the product withdrawal through duct 26.

A suitable electrolyte, for example sodium chloride solution, is fed into the concentrating chambers 19 through a supply manifold 29, and ion enriched solution is withdrawn from the concentrating chambers through a collecting manifold 30 which discharges concentrate into a concentrate tank 31 through a duct 32.

A pump 33 withdraws liquid from the tank 31 and feeds it into the supply manifold 29 at a pressure $p$ and $\Delta p$ readable on a gage 34. This pressure exceeds the pressure $p$ at 24 by an amount $\Delta p$ which may be of the order of 20 percent of the pressure $p$.

The existence of a pressure differential is further indicated by the location of the concentrate tank 31 at a higher level than the whey tank.

The pressure differential may be produced by hydrostatic unequality, such as the liquid column equal to the difference in the liquid levels in tanks 31 and 21, or by a flow restriction in outflow duct 32, or by a higher flow rate of the concentrate than of the whey.

Whichever means are employed, the result is a pressure differential $\Delta p$ across the membranes. Should a hydraulic leak occur in any membrane, or membrane seal, it will cause concentrate to flow into the whey stream, but will prevent whey from passing into the concentrate stream which would then cause calcium phosphate to precipitate in the concentrating chambers and the resultant impairment of the operation of the cell by clogging.

Passage of saline concentrate into the recirculating whey stream solely affects the efficiency of the demineralization process which proceeds somewhat more slowly, but does not cause precipitation and clogging.

Whey demineralization cells require periodic disassembly and cleaning, at which time the leak is readily discovered and remedied, but a hydraulic leak does not under the condition of excess pressure in the concentrate stream require an interruption or discontinuance of the demineralization process.

The tank 31 is originally filled through a supply duct 35 and a further duct 36 may be provided for the purpose of adding a diluting liquid in order to limit the degree of concentration of the saline solution in the tank during the whey desalination process. Excess liquid volume is withdrawn from the tank 31 through an overflow duct 43.

Electrolyte is passed through the electrode chambers 16 and 17 through ducts 37, 38, 39 and 40.

Example 1a

Whey solution was deionized in a 100 compartment cell constructed according to FIG. 1.

Potential 185 v. Current 90 amps after one hour of operation. Flow rate through whey compartments 5 cm./sec. Flow rate through salt collecting compartments 7 cm./sec. Equal hydraulic pressure in whey compartments and salt collecting compartments. Operating time 8 hours.

Results: After disassembly of the cell only traces of calcium phosphate precipitate were found in the chambers.

Example 1b

Example 1a was repeated with a cell in which hydraulic leaks were produced by tears in three neutral membranes. Average pressure in concentrate chambers 8 p.s.i., pressure in dilute chambers 6 p.s.i.

Results: After 9 hours of operation the same volume of product of the same degree of deionization was produced as in Example 1a, the salt reduction being from 8% to 3%. The chambers of the cell contained traces of calcium precipitate approximately equal in quantity to the precipitate of Example 1a.

Example 1c

Example 1b was repeated with the only distinction that the pressure in the whey chambers was increased to 8 p.s.i. to equal the pressure in the concentrate chambers.

Results: In order to maintain the current constant at 90 amps. the potential required gradual increase from 185 to 225 v. during the 8 hour period. The liquid streams tended to increase in temperature, but the increase was counteracted by cooling of the streams to maintain the mean temperature between 75 and 78° F. After 8 hours of operation substantial amounts of calcium were found precipitated in the salt collecting chambers on all cation selective membranes. As 225 v. was the maximum available voltage, operation of the cell had to be discontinued. The cell required disassembly for the purpose of cleaning by hand.

Observation of the cell under non-leakage conditions brought to light a secondary and unexpected side effect illustrated by the following examples:

Example 2a

The apparatus of Example 1 was operated under condition of pressure equality in the whey and salt collecting compartments with the following significant data:

Operating time 8 hours. Initial potential 165 v. Current 80 amps. After one hour of operation the potential was 167 v., current 80 amps.

After 7½ hours of operation the potential was 184 v., current 80 amps.

Flow rates through compartments: Whey 5 cm./sec. Salt collecting stream 7 cm./sec.

Example 2b

Example 2a was repeated with only one change, the pressure in the salt collecting compartments was increased 18 percent, from 8 p.s.i. to 11 p.s.i. by increase in the flow velocity from 7 cm./sec. to 9 cm./sec. After 7½ hours of operation the potential was 171 v., the current 80 amps.

An examination and comparison of the cells after Example 2a and 2b showed no difference in the amount of precipitate of calcium phosphate, which was present only in traces. The improvement in the economy of operation is ascribed to lower polarization at the face of the cation membranes in the whey compartments.

The following appears to be a reasonable explanation of this phenomenon.

During operation at pressure equality a slight space exists between the membrane 12 and a mesh type separator or spacer 41 and a highly deionized, relatively quiescent layer 42 of liquid may form along the face of the membrane (FIG. 2a).

The pressure across the membrane presses the membrane against the spacer (FIG. 2b) and the quiescent layer of liquid is broken up and replaced by liquid of higher conductivity in a state of relative turbulence.

Other phenomena may very well be causative of, or contributory to, the operational improvement. Regardless of the specific cause, the operational improvement is attained by the disclosed operation under pressure inequality.

What is claimed is:

1. In the method of demineralizing a whey solution stream comprising, flowing said stream through certain deionizing chambers of an electrodialysis apparatus in which dieonizing chambers and concentrating chambers are arranged in alternating order, said chambers being defined, respectively, between a plurality of spaced alternatingly disposed hydraulically substantially impermeable membranes of two kinds, the one kind being selectively permeable to ions of one polarity and passage-resistant to ions of the opposite polarity, the membranes of the other kind being permeable to ions of said opposite polarity; flowing an electrolyte solution as a concentrating stream through the concentrating chambers lying between said certain chambers; applying at electrodes a direct electric potential to pass an electric current in series across said membranes and the chambers defined between them, the polarity being such as to cause ions of said opposite polarity in said whey stream to migrate away from the respective membrane bordering the respective stream, which membrane is passage-resistant to said opposite polarity ion, said electrodes being disposed in electrode chambers; and passing electrolyte through said electrode chambers, the improvement which is characterized by (1) said membranes of one kind being selectively cation permeable, (2) said membranes of the other kind being substantially neutral, thereby providing a path for cations through a plurality of successive whey streams and (3) maintaining a higher hydraulic pressure in the concentrating stream chambers than in the whey stream chambers between them.

2. In the method of demineralizing a whey solution stream comprising, flowing said stream through certain deionizing chambers of an electrodialysis apparatus in which deionizing chambers and concentrating chambers are arranged in alternating order, said chambers being defined, respectively, between a plurality of spaced alternatingly disposed hydraulically substantially impermeable membranes of two kinds, the one kind being selectively permeable to ions of one polarity and passage-resistant to ions of the opposite polarity, the membranes of the other kind being permeable to ions of said opposite polarity; flowing an electrolyte solution as a concentrating stream through the concentrating chambers lying between said certain chambers; applying at electrodes a direct electric potential to pass an electric current in series across said membranes and the chambers defined between them, the polarity being such as to cause ions of said opposite polarity in said whey stream to migrate away from the respective membrane bordering the respective stream, which membrane is passage resistant to said opposite polarity ion, said electrodes being disposed in electrode chambers; passing electrolyte through said electrode chambers; and recirculating said whey stream and said concentrating stream, the improvement characterized by (1) said membranes of one kind being selectively cation permeable, (2) said membranes of the other kind being substantially neutral, thereby providing a path for cations through a plurality of successive whey streams and concentrating stream, and (3) maintaining the relative hydrostatic pressures and relative flow rates of the concentrating stream and the whey stream such as to maintain a higher hydraulic pressure in the concentrating chambers than in the whey chambers.

3. The method as defined in claim 1 in which the flow rate through said certain chambers is maintained lower than the flow rate through the said concentrating chambers lying between said certain chambers.

4. The method as defined in claim 1 in which said certained in a state of higher turbulence than in said con- and in which the stream in said certain chambers is maintained in a state of higher turbulence than in said concentrating chambers.

References Cited

UNITED STATES PATENTS

| | | | |
|---|---|---|---|
| 1,022,523 | 4/1912 | Whitney | 204—180P |
| 2,631,100 | 3/1953 | Aten et al. | 99—57 |
| 2,758,965 | 8/1956 | Block et al. | 204—180P |
| 2,848,403 | 8/1958 | Rosenberg | 204—180P |
| 2,872,407 | 2/1959 | Kollsman | 204—301 |
| 3,166,486 | 1/1965 | Hull | 204—180P |
| 3,325,389 | 6/1967 | Parsi et al. | 204—180P |
| 3,369,906 | 2/1968 | Chen | 99—77 |
| 3,440,159 | 4/1969 | McRae et al. | 204—180P |
| 3,484,356 | 12/1969 | Goujard | 204—180P |

JOHN H. MACK, Primary Examiner

A. C. PRESCOTT, Assistant Examiner

U.S. Cl. X.R.

99—57